(12) United States Patent
Lee et al.

(10) Patent No.: US 10,948,342 B2
(45) Date of Patent: Mar. 16, 2021

(54) BELL STATE MEASUREMENT APPARATUS BASED ON SINGLE-MODE OPTICAL FIBER

(71) Applicant: Korea Research Institute of Standards and Science, Daejeon (KR)

(72) Inventors: Sang Min Lee, Seoul (KR); Hee Su Park, Daejeon (KR)

(73) Assignee: Korea Research Institute of Standards and Science, Daejeon (KR)

(*) Notice: Subject to any disclaimer, the term of this patent is extended or adjusted under 35 U.S.C. 154(b) by 175 days.

(21) Appl. No.: 16/419,242

(22) Filed: May 22, 2019

(65) Prior Publication Data
US 2019/0360861 A1    Nov. 28, 2019

(30) Foreign Application Priority Data
May 25, 2018 (KR) .................. 10-2018-0059349

(51) Int. Cl.
*G01J 1/04* (2006.01)
*G01J 1/44* (2006.01)
*G02B 6/293* (2006.01)

(52) U.S. Cl.
CPC ........... *G01J 1/0425* (2013.01); *G01J 1/0429* (2013.01); *G01J 1/44* (2013.01); *G02B 6/29302* (2013.01); *G01J 2001/442* (2013.01); *G01J 2001/4466* (2013.01)

(58) Field of Classification Search
CPC ...... G01J 1/0425; G01J 1/0429; G01J 1/0407; G01J 1/04; G01J 1/44; G01J 2001/442; G01J 2001/446; G01J 2001/4466; G02B 6/29302; G02B 6/293; G02B 27/28; G02B 27/283; G02B 27/286; G02F 1/3526; H04B 10/70
See application file for complete search history.

(56) References Cited

U.S. PATENT DOCUMENTS

| | | | |
|---|---|---|---|
| 6,028,935 A * | 2/2000 | Rarity | H04L 9/0858 380/256 |
| 6,444,999 B1 | 9/2002 | Tomita | |
| 8,265,280 B2 * | 9/2012 | Lee | H04B 10/70 380/263 |
| 9,287,994 B2 * | 3/2016 | Nordholt | H04K 1/08 |
| 10,805,011 B2 * | 10/2020 | Bitauld | G02F 1/21 |
| 2005/0006593 A1 | 1/2005 | Kastella et al. | |
| 2007/0250280 A1 * | 10/2007 | Beausoleil | G06N 10/00 702/79 |
| 2009/0079991 A1 * | 3/2009 | Hirata | G01B 9/02007 356/491 |
| 2009/0190759 A1 * | 7/2009 | Peev | H04L 9/0858 380/256 |
| 2010/0208334 A1 | 8/2010 | Kanter et al. | |
| 2010/0252745 A1 | 10/2010 | Hunt et al. | |
| 2010/0309469 A1 * | 12/2010 | Kanter | H04B 10/70 356/364 |
| 2011/0001959 A1 * | 1/2011 | Hasegawa | H04B 10/071 356/73.1 |
| 2012/0063596 A1 * | 3/2012 | Brodsky | H04L 9/0858 380/256 |

(Continued)

*Primary Examiner* — John R Lee
(74) *Attorney, Agent, or Firm* — The Webb Law Firm

(57) ABSTRACT

The present invention relates to a Bell state measurement apparatus capable of increasing a probability in which a determination that a Bell state measurement fails by using an optical fiber.

12 Claims, 2 Drawing Sheets

(56) References Cited

U.S. PATENT DOCUMENTS

| | | | |
|---|---|---|---|
| 2015/0354938 A1* | 12/2015 | Mower | G06N 20/00 |
| | | | 356/477 |
| 2016/0356917 A1* | 12/2016 | Bhongale | G01V 5/04 |
| 2017/0082494 A1* | 3/2017 | Hughes | G02B 27/283 |
| 2017/0222731 A1* | 8/2017 | Lucamarini | H04L 9/0858 |
| 2019/0360861 A1* | 11/2019 | Lee | G01J 1/44 |

* cited by examiner

BELL STATE MEASUREMENT APPARATUS BASED ON SINGLE-MODE OPTICAL FIBER

CROSS-REFERENCE TO RELATED APPLICATION

This application claims priority to Korean Patent Application No. 10-2018-0059349 filed May 25, 2018, the disclosure of which is hereby incorporated by reference in its entirety.

TECHNICAL FIELD

The following disclosure relates to a Bell state measurement apparatus, and more particularly, to a Bell state measurement apparatus capable of decreasing a probability in which a determination that a Bell state measurement fails by using an optical fiber.

BACKGROUND

A single-photon quantum information technology utilizes each photon which is the smallest unit of light as an information transfer medium. Quantum information stored in a photon is represented by a unit called a qubit, and the qubit is a concept corresponding to a bit (0 or 1) which is the smallest unit in modern information technology. The quantum information technology has an advantage in that a quantum entanglement existing between two or more photons is used, that is, a quantum mechanical correlation is used, as compared to a conventional information processing technology. The quantum entanglement is a strong correlation that may not be explained by classical physics, in which a qubit of each photon may be used for storing and calculating complicated information which may not be expressed by using a simple bit (the smallest unit of information) and may be used in a quantum teleportation that transmits quantum information between different photons or different quantum information media.

A Bell state is the most basic quantum entangled state between two photons. Two qubits are in a Bell state and each qubit may be expressed by a polarization of a single photon. For example, a qubit is encoded in such a way that a case where a photon has a horizontal polarization is regarded as $|H\rangle$ and a case where a photon has a vertical polarization is regarded as $|V\rangle$. Whether or not two photons are in a Bell state needs to be measured in order to experimentally verify a quantum entanglement of a Bell state or to realize a quantum teleportation protocol by using a quantum entanglement between multiple photons. Such a measurement is performed by a projection measurement in a Bell state. Usually, in quantum mechanics, four Bell states $|\Phi^+\rangle$, $|\Phi^-\rangle$, $|\Psi^+\rangle$, and $|\Psi^-\rangle$, each represented by equations such as $|\Phi^+\rangle=|H\rangle|H\rangle+|V\rangle|V\rangle$, $|\Phi^-\rangle=|H\rangle|H\rangle-|V\rangle|V\rangle$, $|\Psi^+\rangle=|H\rangle|V\rangle+|V\rangle|H\rangle$, and $|\Psi^-\rangle=|H\rangle|V\rangle-|V\rangle|H\rangle$, respectively, of which the Bell state belongs to is found.

A method of measuring a Bell state between photons is performed by combining a non-polarizing beam splitter (NPBS) and a polarizing beam splitter (PBS). The original combining structure of NPBS and PBS was proposed by Braunstein and Mann in 1995. A manner of using a structure of one NPBS, two PBSs, and four single-photon detectors which is implemented by Mattle et al. in 1996 is currently widely used. However, this manner has two following limitations. First, an input may be measured in a case of $|\Psi^+\rangle$ or $|\Psi^-\rangle$, but may not be measured in a case of $|\Phi^+\rangle$ or $|\Phi^-\rangle$ because the inputs are not distinguished from each other. Outputs for two inputs of $|\Phi^+\rangle$ and $|\Phi^-\rangle$—may not be used at all because they are not distinguished from a case where a photon is lost in the way or a photon detector may not detect the photons. In other words, it is not determined that the input is any one of $|\Phi^+\rangle$ or $|\Phi^-\rangle$. Therefore, the overall measurement success probability is 50% or less. Second, since elements used are free space optical elements that occupy a certain volume, an unrealistically large space is required when the number of qubits is increased or when an additional setup is made for determining a state where inputs are not distinguished. In addition, a complex alignment of beams is required and a performance is relatively and greatly degraded due to a temperature and an ambient noise such as a vibration.

CITED REFERENCE

Patent Document

1. U.S. Pat. No. 6,444,999 B1 "Quantum circuit"
2. US 20050006593 A1 "System and method of detecting entangled photons"
3. US 20100252745 A1 "Generation and detection of frequency entangled photons"
4. US 20100208334 A1 "System and method for entangled photons generation and measurement"

SUMMARY

An embodiment of the present invention is directed to providing a measurement apparatus for a two-photon polarization-qubit Bell state.

Another embodiment of the present invention is directed to providing a Bell state measurement apparatus with a high probability for detecting a case where an input state may not be distinguished from input states ($|\Phi^+\rangle$ or $|\Phi^-\rangle$) as compared to existing technologies.

Still another embodiment of the present invention is directed to providing a Bell state measurement apparatus capable of improving efficiency in a restricted space, minimizing beam loss, and minimizing an influence of an ambient noise by using an optical fiber.

Still another embodiment of the present invention is directed to providing a Bell state measurement apparatus that is economical and has reliability in quantum communication.

However, an aspect of the present invention is not limited to the above-mentioned aspects. That is, other aspects that are not mentioned may be obviously understood by those skilled in the art from the following specification.

In one general aspect, a Bell state measurement apparatus includes: two assemblies adjusting polarizations of two input photons, respectively; two optical fiber couplers focusing the input photons on two optical fibers, respectively; a 2×2 optical fiber directional coupler having input terminals connected to the two optical fibers, respectively; two optical fiber polarization controllers coupled to two output terminals of the 2×2 optical fiber directional coupler, respectively; two optical fiber polarizing beam splitters connected to outputs of the optical fiber polarization controllers, respectively; four 1×N optical fiber directional couplers each connected to an output of each of the optical fiber polarizing beam splitters; 4N single-photon detectors connected to output terminals of the 1×N optical fiber directional couplers, respectively; and a coincidence counting instrument analyzing coincidence counts between the single-photon detectors.

The wave plate assembly may be formed by connecting two quarter-wave plates and one half-wave plate to each other in a row.

The 2×2 optical fiber directional coupler and the 1×N optical fiber directional couplers each may be a fused-type directional coupler manufactured by bonding optical fibers side by side or an assembly thereof.

The optical fiber polarization controller may be a paddle-type optical fiber polarization controller winding the optical fibers in a circle to induce a birefringence and adjusting a winding direction and degree.

The optical fiber polarizing beam splitter may include a first input terminal, a second input terminal, a first output terminal, and a second output terminal, and components of a vertical polarization incident into the first input terminal and the second input terminal may propagate to the first output terminal and the second output terminal, respectively, and components of a horizontal polarization incident into the first input terminal and the second input terminal may propagate to the second output terminal and the first output terminal, respectively.

The optical fiber polarization controller may be adjusted to compensate for a birefringence induced by the optical fiber connecting the optical fiber coupler, the optical fiber directional coupler, and the optical fiber polarizing beam splitter to each other.

The single-photon detector may be a Geiger-mode avalanche photodiode (APD) detector or a superconducting nanowire-based detector and may output a photon detection result as ON-OFF.

The coincidence counting instrument may be a device which measures a frequency at which two photon detectors among the 4N single-photon detectors are detected coincidentally within a preset coincidence counting time window, and the coincidence counting instrument may accumulate combinations of the single-photon detectors detected coincidentally and the number of coincidence counts of each combination during a predetermined measurement time, and may be implemented by a field programmable gate array (FPGA)-based electronic circuit.

In another general aspect, a Bell state measurement apparatus includes: two wave plate assemblies adjusting polarizations of two input photons, respectively; two optical fiber couplers focusing the input photons on two optical fibers, respectively; a 2×2 optical fiber directional coupler having input terminals connected to the two optical fibers, respectively; two optical fiber polarization controllers coupled to two output terminals of the 2×2 optical fiber directional coupler, respectively; two optical fiber polarizing beam splitters connected to outputs of the optical fiber polarization controllers, respectively; four 1×N optical fiber directional couplers each connected to an output of each of the optical fiber polarizing beam splitters; 4N single-photon detectors connected to output terminals of the 1×N optical fiber directional couplers, respectively; a coincidence counting instrument analyzing coincidence counts between the single-photon detectors; an auxiliary laser source used for finding an optimal state of the wave plate assemblies and the optical fiber polarization controllers; polarizers measuring a polarization direction of the auxiliary laser source; quarter-wave plates adjusting a polarization of the auxiliary laser source; and power meters measuring an output of the auxiliary laser source.

The auxiliary laser source may be aligned to be incident to the 1×N optical fiber directional couplers through output terminals of the 1×N optical fiber directional couplers, and the power meters may be arranged to measure an intensity of the auxiliary laser source output from the input terminals of the 2×2 optical fiber directional coupler.

The polarizers, the quarter-wave plates, and the optical fiber polarization controllers may be arranged so that an output of the power meter is maximized or minimized.

The auxiliary laser source, the polarizers, the quarter-wave plates, and the power meters may be removed from an optical path after the optical fiber polarization controllers are arranged under an optimal condition.

DETAILED DESCRIPTION OF EMBODIMENTS

Since the present invention may be variously modified and have several exemplary embodiments, specific exemplary embodiments will be shown in the accompanying drawings and will be described in detail in a detailed description. However, it is to be understood that the present invention is not limited to a specific exemplary embodiment, but includes all modifications, equivalents, and substitutions without departing from the scope and spirit of the present invention. When it is determined that a detailed description for any known art related to the present invention may obscure the gist of the present invention, the detailed description will be omitted.

Terms used in the present specification are used only in order to describe specific exemplary embodiments rather than limiting the present invention. Singular forms are intended to include plural forms unless the context clearly indicates otherwise. It will be further understood that the terms "comprises" or "includes" used in this specification, specify the presence of stated features, steps, operations, components, parts mentioned in this specification, or a combination thereof, but do not preclude the presence or addition of one or more other features, numerals, steps, operations, components, parts, or a combination thereof.

Hereinafter, a Bell state measurement apparatus based on an optical fiber of the present invention will be described in detail with reference to the accompanying drawings.

Figure 1:
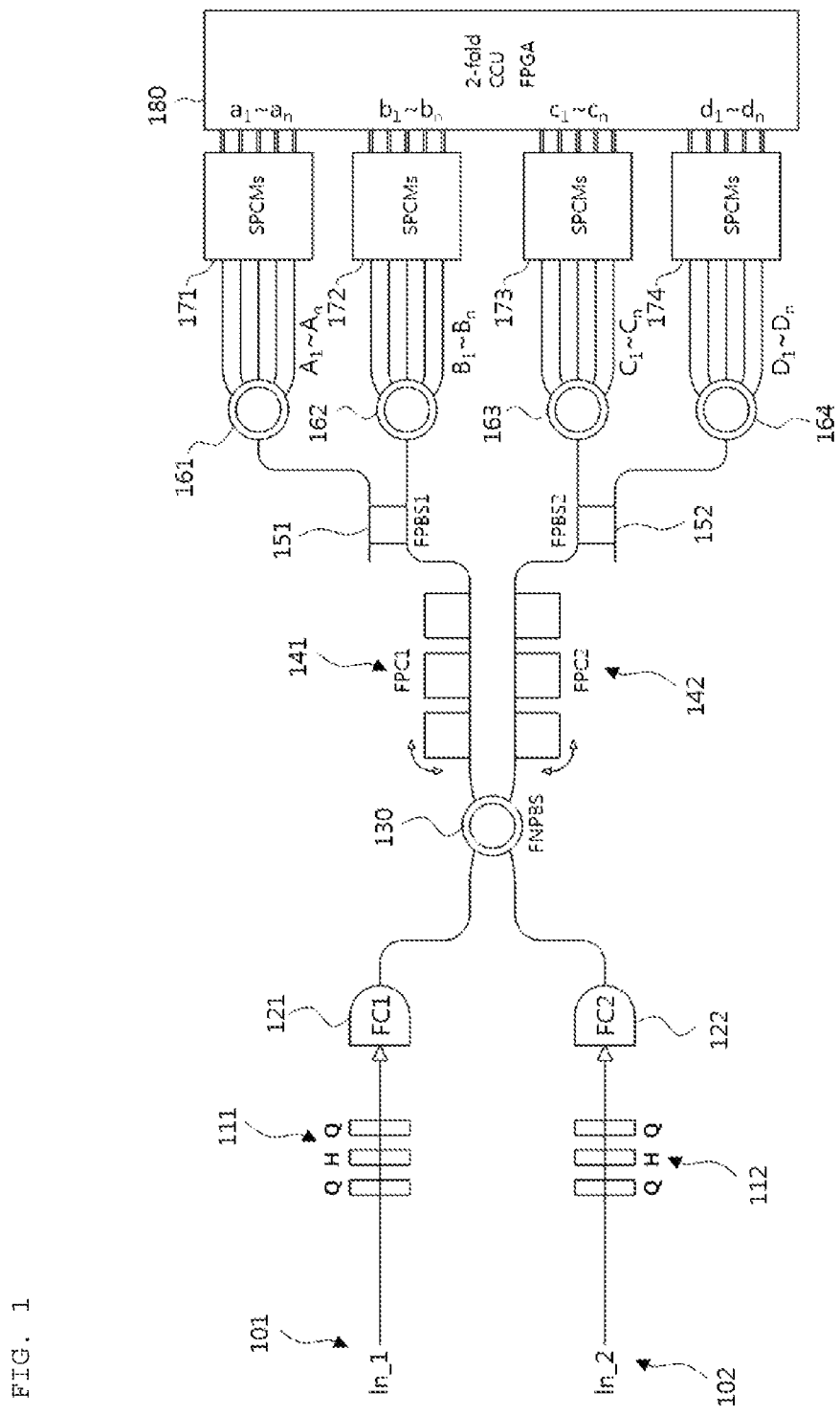
FIG. 1 is a view illustrating a configuration of a Bell state measurement apparatus according to an exemplary embodiment of the present invention.

FIG. 1 is a view illustrating a configuration of a Bell state measurement apparatus according to an exemplary embodiment of the present invention. As illustrated in FIG. 1, a Bell state measurement apparatus based on an optical fiber according to an exemplary embodiment of the present invention includes: two wave plate assemblies 111 and 112 adjusting polarizations of two input photons 101 and 102, respectively; two optical fiber couplers 121 and 122 focusing the input photons on two optical fibers, respectively; a 2×2 optical fiber directional coupler 130 having input terminals connected to the two optical fibers, respectively; two optical fiber polarization controllers 141 and 142 coupled to two output terminals of the 2×2 optical fiber directional coupler 130, respectively; two optical fiber polarizing beam splitters 151 and 152 connected to outputs of the optical fiber polarization controllers, respectively; four 1×N optical fiber directional couplers 161, 162, 163, and 164 each connected to an output of each of the optical fiber polarizing beam splitters 151 and 152; 4N single-photon detectors 171, 172, 173, and 174 connected to output terminals of the 1×N optical fiber directional couplers 161, 162, 163, and 164, respectively; and a coincidence counting instrument 180 analyzing coincidence counts between the single-photon detectors 171, 172, 173, and 174. Here, N indicates a natural number of 2 or more. The 2×2 optical fiber directional coupler has two inputs and two outputs, and the 1×N optical fiber directional coupler has one input and N outputs.

The wave plate assemblies 111 and 112 may be formed by connecting two quarter-wave plates Qs and one half-wave plate H to each other in a row. The wave plate assembly may be formed by connecting Q-H-Q sequentially.

The 2×2 optical fiber directional coupler 130 and the 1×N optical fiber directional couplers 161, 162, 163, and 164 may be a fused-type directional coupler manufactured by bonding optical fibers side by side or an assembly thereof.

The optical fiber polarization controllers 141 and 142 may be a paddle-type optical fiber polarization controller winding the optical fibers in a circle to induce a birefringence and adjusting a winding direction and degree.

Each of the optical fiber polarizing beam splitters 151 and 152 includes a first input terminal, a second input terminal, a first output terminal, and a second output terminal. Components of a vertical polarization incident into the first input terminal and the second input terminal may propagate to the first output terminal and the second output terminal, respectively. Components of a horizontal polarization incident into the first input terminal and the second input terminal may propagate to the second output terminal and the first output terminal, respectively.

The optical fiber polarization controllers 141 and 142 may be adjusted to compensate for each of the birefringences induced by the optical fibers connecting the optical fiber couplers 121 and 122, the optical fiber directional coupler 130, and the optical fiber polarizing beam splitters 151 and 152 to each other.

The single-photon detectors 171, 172, 173, and 174 each are a Geiger-mode avalanche photodiode (APD) detector and may be a detector that outputs a photon detection result as ON-OFF. In addition, the single-photon detectors 171, 172, 173, and 174 may be a superconducting nanowire-based detector.

The coincidence counting instrument 180 is a device which measures a frequency at which two photon detectors among the 4N single-photon detectors 171, 172, 173, and 174 are detected coincidentally within a preset coincidence counting time window. The coincidence counting instrument 180 may accumulate combinations of the single-photon detectors detected coincidentally and the number of coincidence counts of each combination during a predetermined measurement time. The coincidence counting instrument 180 may be implemented by a field programmable gate array (FPGA)-based electronic circuit.

Hereinafter, a Bell state measurement apparatus based on an optical fiber of the present invention will be described in detail with reference to FIG. 1. As illustrated in FIG. 1, a Bell state measurement apparatus basically includes one NPBS, two PBSs, and single-photon detectors as in a Bell-state analyzer in free space. The present apparatus and the Bell-state analyzer in free space are different in that optical elements (1 NPBS+2 PBS) are implemented by optical fibers and additional components are included in the present apparatus. In free space, it is required to match spatial modes of two beams input to NPBS, but if NPBS is implemented in an optical fiber, it is not required to match spatial modes of two beams. However, since a polarization of a beam propagating through the optical fiber is arbitrarily changed due to a spatial distortion of the optical fiber, a device for correcting such an arbitrary polarization is required. The optical fiber polarization controllers 141 and 142 and the wave plate assemblies 111 and 112 of FIG. 1 are devices added for correcting such an arbitrary polarization. The 1×N optical fiber directional couplers 161, 162, 163, and 164 are also devices which are not present in a conventional free space experimental setup, and are an experimental setup added to confirm with high probability a case where a Bell state measurement fails. In the conventional setup, a photon-number-resolving detector is required to confirm a case where a Bell state measurement fails. The reason for the case where a Bell state measurement fails is that two photons are output from one output unit of PBS (151 or 152). On the other hand, in an optical fiber-based setup of the present invention, the 1×N optical fiber directional couplers 161, 162, 163, and 164 are connected to the output units of PBSs 151 and 152 in a relatively easy manner to divide two photons into various modes, such that a case where a Bell state measurement fails by a general on/off single-photon detector is confirmed with high probability (N−1)/N. In a case where two photons are output from one output unit of each of the 1×N optical fiber directional couplers 161, 162, 163, and 164, the confirmation still fails, and the probability is 1/N.

When a Bell state measurement is performed with the setup as in FIG. 1, two photons are arbitrarily output from the output units of the four 1×N optical fiber directional couplers 161, 162, 163, and 164. The output photons are converted into electrical signals by the single-photon detectors 171, 172, 173, and 174 and the electrical signals become input values of the coincidence counting instrument 180. The coincidence counting instrument 180 determines a case where two signals are coincidentally input thereto. Accordingly, a case where two photons are output from one output unit of an optical fiber is not determined by the coincidence counting instrument. In a case the coincidence counting instrument 180 has two input values, a Bell state is distinguished depending on positions at which the input values are measured. $|\Psi^+\rangle$ is a Bell state when one input value is measured in one of $a_i$ modes and the other input value is measured in one of $b_j$ modes, or when one input value is measured in $c_k$ modes and the other input value is measured in $d_i$ modes are measured. $|\Psi^-\rangle$ is a Bell state when one input value is measured in the $a_i$ modes and the other input value is measured in the $d_l$ modes are measured, or when one input value is measured in the $b_j$ modes and the other input value is measured in the $c_k$ modes are measured. $|\Phi^+\rangle$ and $|\Phi^-\rangle$ are Bell states when the Bell state measurement fails, that is, when two photons are measured in the $a_i$ modes, $b_j$ modes, $c_k$ modes, or $b_j$ modes. In a case where two signals are generated in one mode combination and the coincidence count is measured, even though the Bell state measurement fails, the failure may be confirmed. In a case where two photons are measured in one mode, coincidence counting measurement is not possible, and thus there is no way to confirm even the failure. A method of confirming success or failure in a Bell state measurement may be a method of determining a form of coincidence counting as above-mentioned. This may be implemented through a relatively simple logic gate operation and a field programmable gate array (FPGA). For example, a case where two signals are measured in the $a_i$ modes may be recognized by monitoring a case of $a_1 + \ldots + a_N = 2$. A coincidence signal between combinations of different modes may be processed by an AND gate for each output value of an OR gate after setting the output value of the OR gate for the combinations of each mode (aa=$a_1 \cup \ldots \cup a_N$). As a result, as illustrated in Table 1, success or failure in a Bell state may be confirmed by monitoring the following eight cases.

TABLE 1

Eight cases of input values of coincidence counting instrument for determining four Bell states

| Bell state | Eight cases |
|---|---|
| $|\Psi^-\rangle$ | $(a_1 \cup a_2 \cup \ldots \cup a_N) \cap (d_1 \cup d_2 \cup \ldots \cup d_N)$ |
|  | $(b_1 \cup b_2 \cup \ldots \cup b_N) \cap (c_1 \cup c_2 \cup \ldots \cup c_N)$ |
| $|\Psi^+\rangle$ | $(a_1 \cup a_2 \cup \ldots \cup a_N) \cap (b_1 \cup b_2 \cup \ldots \cup b_N)$ |
|  | $(c_1 \cup c_2 \cup \ldots \cup c_N) \cap (d_1 \cup d_2 \cup \ldots \cup d_N)$ |
| $|\Phi^+\rangle, |\Phi^-\rangle$ | $a_1 + a_2 + \ldots + a_N = 2$ |
|  | $b_1 + b_2 + \ldots + b_N = 2$ |
|  | $c_1 + c_2 + \ldots + c_N = 2$ |
|  | $d_1 + d_2 + \ldots + d_N = 2$ |

Figure 2:
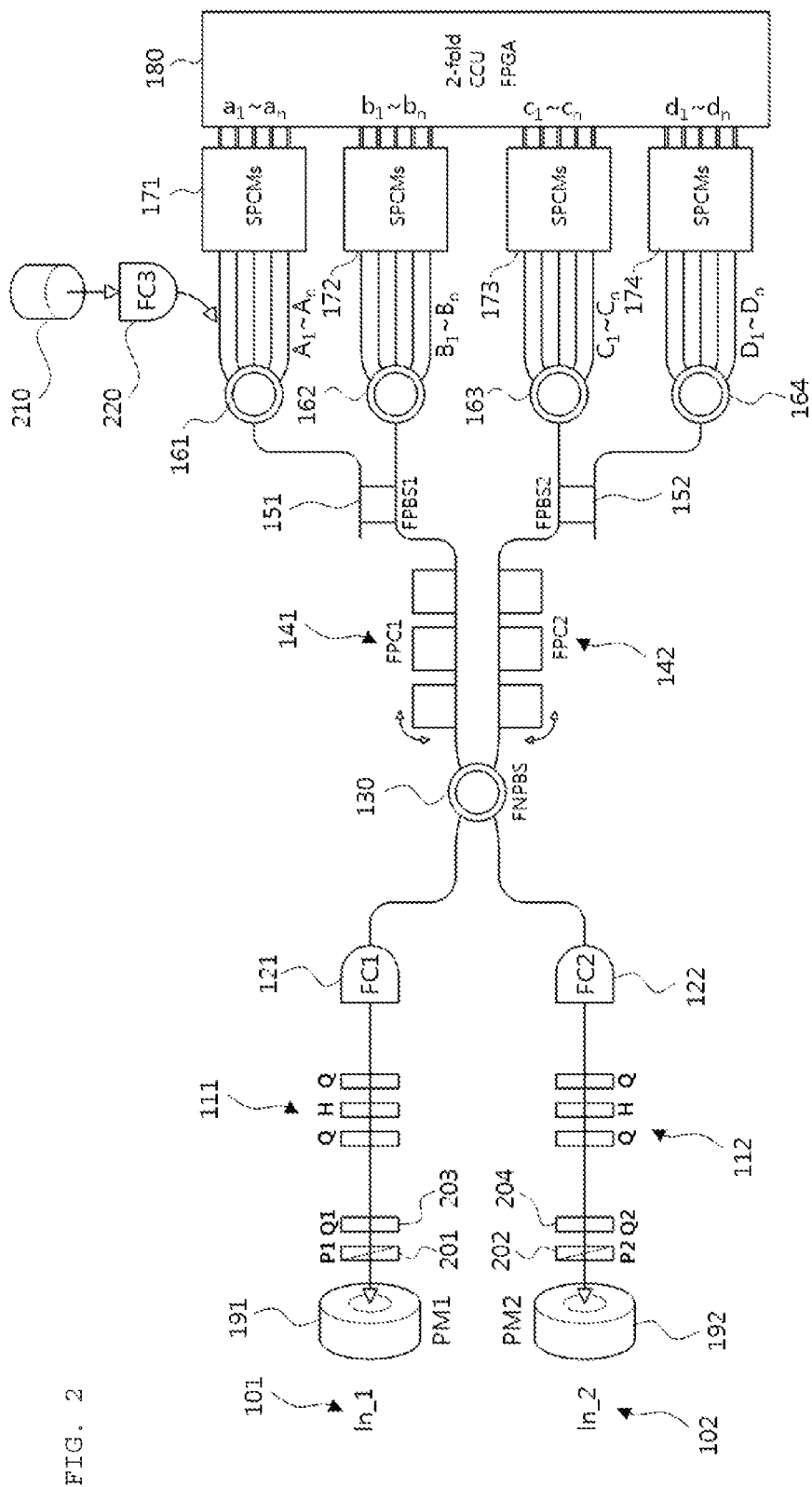
FIG. 2 is a view illustrating a configuration of a Bell state measurement apparatus according to another exemplary embodiment of the present invention.

FIG. 2 is a view illustrating a configuration of a Bell state measurement apparatus including additional components required for an optimal arrangement according to another embodiment of the present invention. As illustrated in FIG. 2, a Bell state measurement apparatus based on an optical fiber according to an exemplary embodiment of the present invention includes: two wave plate assemblies 111 and 112 adjusting polarizations of two input photons, respectively; two optical fiber couplers 121 and 122 focusing the input photons on two optical fibers, respectively; a 2×2 optical fiber directional coupler 130 connecting having input terminals connected to the two optical fibers, respectively; two optical fiber polarization controllers 141 and 142 coupled to two output terminals of the 2×2 optical fiber directional coupler 130, respectively; two optical fiber polarizing beam splitters 151 and 152 connected to outputs of the optical fiber polarization controllers, respectively; four 1×N optical fiber directional couplers 161, 162, 163, and 164 connected to an output of each of the optical fiber polarizing beam splitters 151 and 152; 4N single-photon detectors 171, 172, 173, and 174 connected to output terminals of the 1×N optical fiber directional couplers 161, 162, 163, and 164, respectively; a coincidence counting instrument 180 analyzing coincidence counts between the single-photon detectors 171, 172, 173, and 174; an auxiliary laser source 210 used for finding an optimal state of the wave plate assemblies 111 and 112 and the optical fiber polarization controllers 141 and 142; polarizers 201 and 202 measuring a polarization direction of the auxiliary laser source 210; quarter-wave plates 203 and 204 adjusting a polarization of the auxiliary laser source 210; and power meters 191 and 192 measuring an output of the auxiliary laser source.

The auxiliary laser source 210 may be aligned to be incident to the 1×N optical fiber directional couplers 161, 162, 163, and 164 through output terminals of the 1×N optical fiber directional couplers 161, 162, 163, and 164. In addition, the auxiliary laser source 210 is connected to an optical fiber coupler 220 focusing beam output from the auxiliary laser source 210 on a separate optical fiber. The 1×N optical fiber directional coupler may have an output terminal connected to the optical fiber.

The power meters 191 and 192 may measure an intensity of the beam output from the auxiliary laser source 210 output through the input terminal of the 2×2 optical fiber directional coupler 130.

The polarizers 201 and 202, the quarter-wave plates 203 and 204, the wave plate assemblies 111 and 112, and the optical fiber polarization controllers 141 and 142 may be arranged so that outputs of the power meters 191 and 192 are maximized or minimized.

The auxiliary laser source 210, the optical fiber coupler 220, the polarizers 201 and 202, the quarter-wave plates 203 and 204, and the power meters 191 and 192 may be removed from an optical path after the wave plate assemblies 111 and 112, and the optical fiber polarization controllers 141 and 142 are arranged under the optimal condition.

Hereinafter, a method of adjusting the optical fiber polarization controllers and the wave plate assemblies to correct polarization components arbitrarily changed by the optical fibers in the Bell state measurement apparatus based on an optical fiber of the present invention will be described with reference to FIG. 2. To this end, the auxiliary laser source 210 having a wave the same as that of a single photon, the additional quarter-wave plates Qs (203 and 204), the polarizers Ps (201 and 202), and the power meters PMs (191 and 192) are required.

First, fast-axes of the Qs (203 and 204) and polarization-axes of the Ps (201 and 202), which are additionally installed in input units 1 and 2 (101 and 102), respectively, and fast-axes of the existing wave plate assemblies QHQs (111 and 112) are aligned to coincide with a linear polarization of a horizontal component in free space. For convenience, assuming that alignment is performed so that output directions of A modes and C modes of the 1×N optical fiber directional couplers 161, 162, 163, and 164 correspond to a horizontal polarization and output directions of B modes and D modes of the 1×N optical fiber directional couplers 161, 162, 163, and 164 correspond to a vertical polarization, a method of aligning polarizations is as follows. After aligning all axes of the wave plates and the polarizers in the input unit 1 (101) to a horizontal axis and then making the auxiliary laser source 210 incident to one of the $B_j$ modes, the optical fiber polarization controller FPC1 (141) is adjusted so that the intensity of the beam measured by the power meter PM1 (191) is minimized. Since for convenience the $B_j$ mode is set to be the vertical polarization as described above, the auxiliary laser source 210 is set to be a vertical polarization in free space when the auxiliary laser source 210 is input to the input unit 1 (101). After making the auxiliary laser source 210 incident to any one output unit of $D_1$ modes of the 1×N optical fiber directional coupler 164 again, the optical fiber polarization controller FPC2 (142) is adjusted so that the intensity of the beam measured by the power meter PM1 (191) is minimized. Thereafter, in a state where the auxiliary laser source 210 is not changed, an angle of the wave plate assembly (112) in the input unit 2 (102) is adjusted so that the intensity of the beam measured by the power meter PM2 (192) is minimized. After these adjustments, the beams of the horizontal polarization incident to the input units 1 and 2 (101 and 102) are always measured at the output units A and C (161 and 163) and the beams of the vertical polarization incident to the input units 1 and 2 (101 and 102) are always measured in the output units B and D (162 and 164). However, in a case where an arbitrary polarization having both horizontal-vertical components is incident, probability in which the polarization is maintained at the optical fiber polarizing beam splitters FPBSs (151 and 152), as it is, is very low, and a phase thereof is generally changed. For example, a linear polarization state in which $a|H\rangle+b|V\rangle$ may be changed to an elliptical polarization state in which $a|H\rangle+e^{\Phi}b|V\rangle$. That is, it is a state in which a relative phase between H and V components is not adjusted.

In particular, the state in which $a|H\rangle+b|V\rangle$ in the input unit 1 (101) is the same as a state in which $a|H\rangle+e^{i\gamma}b|V\rangle$ in the optical fiber polarizing beam splitter FPBS1 (151) and may cause a different phase such as $a|H\rangle+e^{i\delta}b|V\rangle$ in the optical fiber polarizing beam splitter FPBS2 (152). The wave plate assembly QHQ (111) in the input unit 1 (101) serves to equalize a phase difference between γ and δ. At this time, the fast-axes of two quarter-wave plates Qs are rotated by 45 degrees from a horizontal direction. In addition, after the auxiliary laser source 210 is incident to an arbitrary B mode (162), the intensity of the beam measured by the power meter PM2 (192) is recorded while rotating the polarizer P2 (202) from 0 to 90 degrees. Since the beam of the vertical polarization is incident, an intensity value may be minimized at 0 degrees and may be maximized at 90 degrees. Then, the polarizer P2 (202) is rotated to be 0 degrees again, and the intensity of the beam measured by the power meter PM2 (192) is adjusted so as to be approximately the middle value between the two intensities (maximum intensity and minimum intensity) measured above by moving a panel closest to the 2×2 optical fiber directional coupler 130 among three panels of the optical fiber polarization controller PC1 (141). Then, a polarization degree of freedom of the auxiliary laser source 210 input to the input unit 2 (102) is measured by using the polarizer P2 (202) and the quarter-wave plate Q2 (204) to measure a phase difference between H and V. Then, a polarization degree of freedom of the auxiliary laser source 210 input to the input unit 1 (101) is measured. At this time, when the polarization degree of freedom is measured while changing H of the wave plate assembly QHQ (111) of the input unit 1 (101) at a constant angle, the phase difference between H and V of the output beam measured in each case may be measured. The angle of the half-wave plate and the phase difference between H and V have a linear relationship. After fitting experimental values, the half-wave plate of the input unit 1 (101) is adjusted so that the phase difference between polarizations input to the input unit 2 (102) and the phase difference between polarizations input to the input unit 1 (101) are coincident with each other. Then, after adjusting the polarizer P2 (202) and the quarter-wave plate Q2 (204) in the horizontal direction again, the panel of the optical fiber polarization controller PC1 (141) is returned to the original state in a manner of minimizing the output of the power meter PM2 (192).

After these adjustments, states of the horizontal and vertical polarizations incident to the input units 1 and 2 (101 and 102) are always measured at the A and C (B and D) output units of the 1×N optical fiber directional coupler 161, 162, 163, and 164, and an arbitrary linear polarization input state in which a|H⟩+b|V⟩ is converted into the state in which a|H⟩+be$^{i\phi}$|V⟩ which is the same as in two optical fiber polarizing beam splitters FPBSs (151 and 152). In this case, the φ value itself may not be zero. However, this does not affect the Bell state measurement. The reason is that |Ψ$^+$⟩ and |Ψ$^-$⟩ states are not changed by a local rotation of a z-axis of the same magnitude.

That is, in a state in which $Z_1(\phi_1)Z_2(\phi_2)(a|HV\rangle_{12}+b|VH\rangle_{12}) \rightarrow ae^{i\phi_2}|HV\rangle+be^{i\phi_1}|VH\rangle \cong a|HV\rangle+be^{i(\phi_1-\phi_2)}|VH\rangle$, if two phases are same, the polarization input state is the state in which a|HV⟩+b|VH⟩ which is same as the initial state. Therefore, the Bell state measurement apparatus based on an optical fiber of the present invention may be operated in the same manner as the Bell-state analyzer in free space.

The method of measuring the polarization degree of freedom of the auxiliary laser source 210 is as illustrated in Table 2. As illustrated in Table 2 polarizations may be measured according to angles of P and Q.

TABLE 2

Angles of P and Q depending on polarization

| Polarization | P angle | Q angle |
|---|---|---|
| H | 0 | 0 |
| V | 90 | 0 |
| D = H + V | 45 | 45 |
| A = H − V | −45 | 45 |
| R = H + iV | 45 | 0 |
| L = H − iV | −45 | 0 |

Values of the intensities of the auxiliary laser source 210 which are measured by the power meters 191 and 192 at each setup are denoted by $I_{H \cdot V \cdot D \cdot A \cdot R \cdot L}$, respectively. In this case, an offset value of the power meters 191 and 192 is adjusted at zero in advance. That is, the intensities measured by the power meters 191 and 192 are set to be zero in advance when the auxiliary laser source 210 is not incident. A polarization vector on Poincare sphere is calculated by using the measured intensities as shown in the following Equation 1.

$$\lambda_x = \frac{I_D - I_A}{I_D + I_A}, \lambda_y = \frac{I_R - I_L}{I_R + I_L}, \lambda_z = \frac{I_H - I_V}{I_H + I_V} \qquad \text{[Equation 1]}$$

The phase difference between H and V polarizations calculated from the obtained polarization vector is $$\tan^{-1}\frac{\lambda_y}{\lambda_x}.$$

The apparatuses 191, 192, 201, 202, 203, 204 for measuring the phase difference between H and V polarizations may be replaced by a polarimeter that measures the polarization state of light.

As set forth above, the present invention may provide a Bell state measurement apparatus capable of improving efficiency in a restricted space, minimizing beam loss, and minimizing an influence of an ambient noise by using an optical fiber. In addition, the present invention may provide a Bell state measurement apparatus that is economical and has reliability in quantum communication.

Although exemplary embodiments of the present invention have been disclosed hereinabove, it may be understood by those skilled in the art that the present invention may be variously modified and altered without departing from the scope and spirit of the present invention described in the following claims.

What is claimed is:
1. A Bell state measurement apparatus comprising:
   two wave plate assemblies adjusting polarizations of two input photons, respectively;
   two optical fiber couplers focusing the input photons on two optical fibers, respectively;
   a 2×2 optical fiber directional coupler having input terminals connected to the two optical fibers, respectively;
   two optical fiber polarization controllers coupled to two output terminals of the 2×2 optical fiber directional coupler, respectively;
   two optical fiber polarizing beam splitters connected to outputs of the optical fiber polarization controllers, respectively;

four 1×N optical fiber directional couplers each having one input terminal connected to an output of each of the optical fiber polarizing beam splitters;

4N single-photon detectors connected to output terminals of the 1×N optical fiber directional couplers, respectively; and a coincidence counting instrument analyzing coincidence counts between the single-photon detectors.

2. The Bell state measurement apparatus of claim 1, wherein the wave plate assembly is formed by connecting two quarter-wave plates and one half-wave plate to each other in a row.

3. The Bell state measurement apparatus of claim 1, wherein the 2×2 optical fiber directional coupler and the 1×N optical fiber directional couplers each are a fused-type directional coupler manufactured by bonding optical fibers side by side or an assembly thereof.

4. The Bell state measurement apparatus of claim 1, wherein the optical fiber polarization controller is a paddle-type optical fiber polarization controller winding the optical fibers in a circle to induce a birefringence and adjusting a winding direction and degree.

5. The Bell state measurement apparatus of claim 1, wherein the optical fiber polarizing beam splitter includes a first input terminal, a second input terminal, a first output terminal, and a second output terminal, and components of a vertical polarization incident into the first input terminal and the second input terminal propagate to the first output terminal and the second output terminal, respectively, and components of a horizontal polarization incident into the first input terminal and the second input terminal propagate to the second output terminal and the first output terminal, respectively.

6. The Bell state measurement apparatus of claim 1, wherein the optical fiber polarization controller is adjusted to compensate for a birefringence induced by the optical fiber connecting the optical fiber coupler, the optical fiber directional coupler, and the optical fiber polarizing beam splitter to each other.

7. The Bell state measurement apparatus of claim 1, wherein the single-photon detector is a Geiger-mode avalanche photodiode (APD) detector or a superconducting nanowire-based detector and outputs a photon detection result as ON-OFF.

8. The Bell state measurement apparatus of claim 1, wherein the coincidence counting instrument is a device which measures a frequency at which two photon detectors among the 4N single-photon detectors are detected coincidentally within a preset coincidence counting time window, and the coincidence counting instrument accumulates combinations of the single-photon detectors detected coincidentally and the number of coincidence counts of each combination during a predetermined measurement time, and is implemented by a field programmable gate array (FPGA)-based electronic circuit.

9. A Bell state measurement apparatus comprising:

two wave plate assemblies adjusting polarizations of two input photons, respectively;

two optical fiber couplers focusing the input photons on two optical fibers, respectively;

a 2×2 optical fiber directional coupler having input terminals connected to the two optical fibers, respectively;

two optical fiber polarization controllers coupled to two output terminals of the 2×2 optical fiber directional coupler, respectively;

two optical fiber polarizing beam splitters connected to outputs of the optical fiber polarization controllers, respectively;

four 1×N optical fiber directional couplers each having one input terminal connected to an output of each of the optical fiber polarizing beam splitters;

4N single-photon detectors connected to output terminals of the 1×N optical fiber directional couplers, respectively;

a coincidence counting instrument analyzing coincidence counts between the single-photon detectors;

an auxiliary laser source used for finding an optimal state of the wave plate assemblies and the optical fiber polarization controllers;

polarizers measuring a polarization direction of the auxiliary laser source;

quarter-wave plates adjusting a polarization of the auxiliary laser source; and power meters measuring an output of the auxiliary laser source.

10. The Bell state measurement apparatus of claim 9, wherein the auxiliary laser source is aligned to be incident to the 1×N optical fiber directional couplers through output terminals of the 1×N optical fiber directional couplers, and the power meters are arranged to measure an intensity of the auxiliary laser source output from the input terminals of the 2×2 optical fiber directional coupler.

11. The Bell state measurement apparatus of claim 9, wherein the polarizers, the quarter-wave plates, and the optical fiber polarization controllers are arranged so that an output of the power meter is maximized or minimized.

12. The Bell state measurement apparatus of claim 9, wherein the auxiliary laser source, the polarizers, the quarter-wave plates, and the power meters are removed from an optical path after the optical fiber polarization controllers are arranged under an optimal condition.

* * * * *